United States Patent
Yabe (10) Patent No.: US 11,240,750 B2
(45) Date of Patent: Feb. 1, 2022

(54) RADIO TRANSMISSION APPARATUS AND CONTROL METHOD

(71) Applicant: NEC Corporation, Tokyo (JP)

(72) Inventor: Masami Yabe, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/054,865

(22) PCT Filed: May 22, 2019

(86) PCT No.: PCT/JP2019/020220
§ 371 (c)(1),
(2) Date: Nov. 12, 2020

(87) PCT Pub. No.: WO2019/225634
PCT Pub. Date: Nov. 28, 2019

(65) Prior Publication Data
US 2021/0219229 A1    Jul. 15, 2021

(30) Foreign Application Priority Data
May 24, 2018  (JP) .............................. JP2018-099446

(51) Int. Cl.
*H04W 52/02*  (2009.01)
*H02J 9/06*   (2006.01)
*H04W 24/08*  (2009.01)

(52) U.S. Cl.
CPC ........... *H04W 52/0206* (2013.01); *H02J 9/06* (2013.01); *H04W 24/08* (2013.01)

(58) Field of Classification Search
None
See application file for complete search history.

(56) References Cited

U.S. PATENT DOCUMENTS

2013/0326059 A1* 12/2013 Gourlay ................. H04L 12/10
                                                       709/224

FOREIGN PATENT DOCUMENTS

JP    2003-284259 A    10/2003
JP    2005-198458 A     7/2005
(Continued)

OTHER PUBLICATIONS

International Search Report of PCT/JP2019/020220 dated Jul. 23, 2019 [PCT/ISA/210].
(Continued)

*Primary Examiner* — Adolf Dsouza
(74) *Attorney, Agent, or Firm* — Sughrue Mion, PLLC (57) ABSTRACT

A radio transmission apparatus (1) includes a first radio communication unit (2A) for performing radio communication in accordance with a predetermined radio communication scheme, a second radio communication unit (2B) for performing radio communication by LPWA (Low Power Wide Area) communication, a control unit (3) for controlling a predetermined device provided in a station accommodating the radio transmission apparatus (1) or the radio transmission apparatus (1) based on a signal received by the second radio communication unit (2B), a power supply unit (4) for supplying power to the first radio communication unit (2A), the second radio communication unit (2B), and the control unit (3), and a storage battery (5) for supplying power to the second radio communication unit (2B) and the control unit (3) when an abnormality occurs in the power supply unit (4).

7 Claims, 9 Drawing Sheets

(56) References Cited

FOREIGN PATENT DOCUMENTS

| JP | 2010-157888 A | 7/2010 |
|----|---------------|--------|
| JP | 2013-048339 A | 3/2013 |
| JP | 2014-022811 A | 2/2014 |
| JP | 2018-093465 A | 6/2018 |

OTHER PUBLICATIONS

Written Opinion of PCT/JP2019/020220 dated Jul. 23, 2019 [PCT/ISA/237].

* cited by examiner

| DB CODE | MONITORING CONTROL CONTENT |
|---|---|
| A A | POWER ON STATION |
| A B | POWER OFF STATION |
| A C | SET POWER SUPPLY VOLTAGE OF STATION |
| ... | ... |
| B A | TURN ON AIR CONDITIONING IN STATION |
| B B | TURN OFF AIR CONDITIONING IN STATION |
| B C | SET AIR CONDITIONING IN STATION |
| ... | ... |
| E A | DETECT ABNORMALITY IN POWER SUPPLY OF STATION |
| E B | DETECT ABNORMALITY IN AIR CONDITIONING OF STATION |
| E C | DETECT UNLOCKING OF STATION ENTRANCE |
| ... | ... |
| Z Y | MISMATCH |
| Z Z | NULL |

RADIO TRANSMISSION APPARATUS AND CONTROL METHOD

CROSS REFERENCE TO RELATED APPLICATIONS

This application is a National Stage of International Application No. PCT/JP2019/020220 filed on May 22, 2019, claiming priority based on Japanese Patent Application No. 2018-099446 filed on May 24, 2018, the entire disclosure of which is incorporated herein.

TECHNICAL FIELD

The present disclosure relates to a radio transmission apparatus and a control method.

BACKGROUND ART

In a station where a radio transmission apparatus for performing desired data communication with another radio transmission apparatus is installed, the station or the radio transmission apparatus may be controlled or monitored using an inband DCN (Data Communication Network) where communication using a transmission line for data communication by the radio transmission apparatus is performed. In such a case, if communication in the inband DCN becomes unavailable for some reason, such control or monitoring cannot be performed. That is, the remote management cannot be performed, and a maintenance personnel must rush to the place where the station is located, which requires a large cost for a maintenance work.

The communication in the inband DCN becomes unavailable due to, for example, an abnormality in the power supply. In this regard, Patent Literature 1 and 2 disclose that a backup power supply is provided in a station so that a communication system does not go down even when an abnormality occurs in the main power supply.

CITATION LIST

Patent Literature

Patent Literature 1: Japanese Unexamined Patent Application Publication No. 2010-157888
Patent Literature 2: Japanese Unexamined Patent Application Publication No. 2005-198458

SUMMARY OF INVENTION

Technical Problem

A backup power supply equivalent to a main power supply is required to continue remote management by an inband DCN. Therefore, when power is supplied by a storage battery in case when an abnormality occurs in the main power supply, the storage battery is required to have a sufficient capacity to continuously supply power equivalent to that of the main power supply. Even if such a storage battery is provided, when an abnormality occurs in a transmission line for data communication due to factors other than an abnormality in the main power supply, communication by the inband DCN becomes unavailable.

One of objects to be achieved by the example embodiments disclosed herein is to provide a radio transmission apparatus and a control method that can reliably control a station or a radio transmission apparatus.

Solution to Problem

A first example aspect is a radio transmission apparatus including: first radio communication means for performing radio communication in accordance with a predetermined radio communication scheme; second radio communication means for performing radio communication by LPWA (Low Power Wide Area) communication; control means for controlling a predetermined device provided in a station accommodating the radio transmission apparatus or the radio transmission apparatus based on a signal received by the second radio communication means; power supply means for supplying power to the first radio communication means, the second radio communication means, and the control means; and a storage battery for supplying power to the second radio communication means and the control means when an abnormality occurs in the power supply means.

A second example aspect is a control method including: supplying, when an abnormality occurs in power supply means for supplying power to first radio communication means for performing radio communication by a predetermined radio communication scheme, power to second radio communication means and control means, the second radio communication means performing radio communication by LPWA (Low Power Wide Area) communication and the control means controlling a predetermined device provided in a station accommodating a radio transmission apparatus or the radio transmission apparatus based on a signal received by the second radio communication means from a storage battery; receiving a signal by the second radio communication means operating by the power supplied from the storage battery; and performing control, by the control means operating by the power supplied from the storage battery, based on the signal received by the second radio communication means.

Advantageous Effects of Invention

According to the above-described example aspects, it is possible to provide a radio transmission apparatus and a control method which can reliably control a station or a radio transmission apparatus.

DESCRIPTION OF EMBODIMENTS

<Overview of Example Embodiment>

Figure 1:
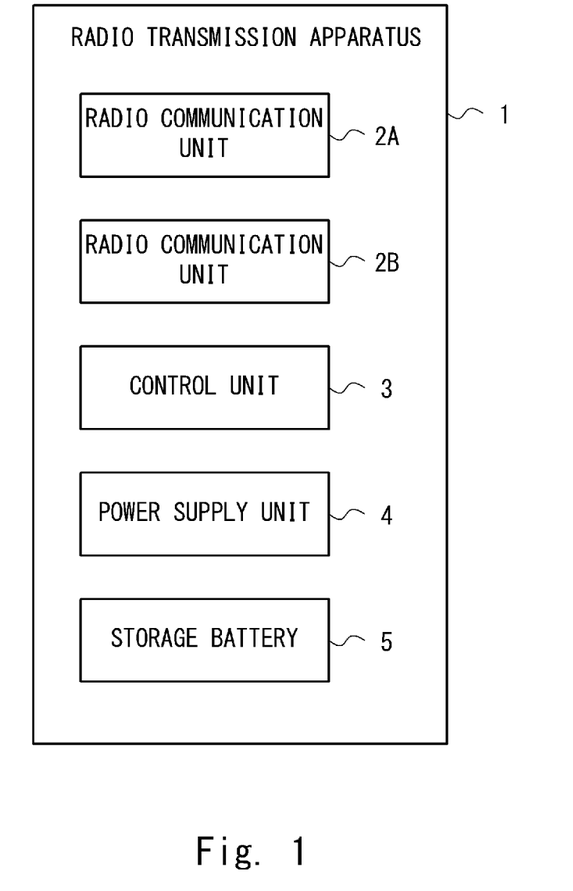
FIG. 1 is a block diagram showing an example of a configuration of a radio transmission apparatus according to an overview of example embodiments.

Prior to a detailed description of the example embodiments, an overview of example embodiments will be described. FIG. 1 is a block diagram showing an example of a configuration of a radio transmission apparatus 1 according to the overview of the example embodiments. As shown in FIG. 1, the radio transmission apparatus 1 includes a radio communication unit 2A, a radio communication unit 2B, a control unit 3, a power supply unit 4, and a storage battery 5.

The radio communication unit 2A performs radio communication in accordance with a predetermined radio communication scheme. The radio communication unit 2B performs radio communication by LPWA (Low Power Wide Area) communication. As described above, the radio transmission apparatus 1 can perform radio communication in accordance with at least two different radio communication schemes. The radio communication unit 2A performs radio communication in accordance with a predetermined radio communication scheme different from the LPWA communication. The radio communication unit 2A is a communication unit for constructing a transmission line for performing desired data communication with another radio transmission apparatus. Thus, when the radio transmission apparatus 1 or the station accommodating the radio transmission apparatus 1 is managed, via the radio communication unit 2A, it means that the management is performed by communication in the inband DCN. On the other hand, when the radio transmission apparatus 1 or the station accommodating the radio transmission apparatus 1 is managed via the radio communication unit 2B, it means that the management is performed by outband DCN communication (i.e., communication that is not inband DCN). Further, the power required for the radio communication in accordance with the above-described predetermined radio communication scheme is larger than the power required for the LPWA communication.

The control unit 3 controls a predetermined device provided in the station accommodating the radio transmission apparatus 1 or the radio transmission apparatus 1 based on a signal received by the radio communication unit 2B. That is, the control unit 3 can perform control by the outband DCN communication.

The power supply unit 4 supplies power to the radio communication unit 2A, the radio communication unit 2B, and the control unit 3. The power supply unit 4 may also supply power to the storage battery 5. The storage battery 5 supplies power to the radio communication unit 2B and the control unit 3 when an abnormality occurs in the power supply unit 4.

According to such a radio transmission apparatus 1, even when an abnormality occurs in the power supply unit 4, and thus normal power cannot be supplied to the radio communication unit 2A, specifically, even when management by the inband DCN is unavailable, power is normally supplied to the radio communication unit 2B and the control unit 3 by the storage battery 5. That is, even in such a case, the radio communication unit 2B and the control unit 3 can operate.

It is thus possible to perform control based on signals received in the outband communication (LPWA communication) by the power supplied from the storage battery 5. Further, since the LPWA communication can perform communication with reduced power consumption, the capacity required for the storage battery 5 can be reduced as compared with the case where the communication by the inband DCN is continued by the power supplied from the storage battery 5. In other words, since the LPWA communication is used, the communication can be continued for a longer period of time as compared with the case where the communication by the inband DCN is continued by the power supplied from the storage battery 5. According to the radio transmission apparatus 1 having such features, it is possible to reliably control the station or the radio transmission apparatus 1.

First Example Embodiment

Figure 2:
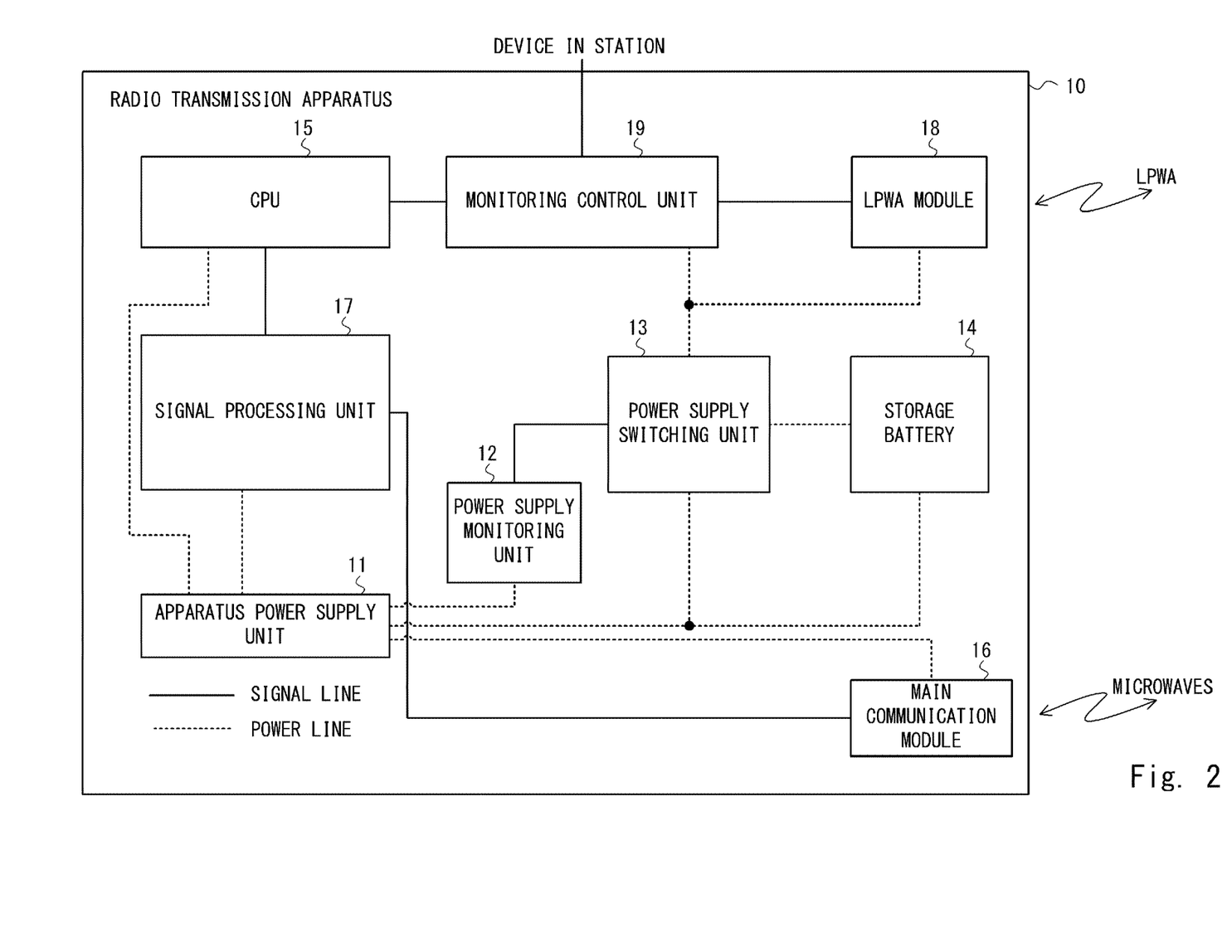
FIG. 2 is a block diagram showing an example of a configuration of a radio transmission apparatus according to a first example embodiment.

Next, details of example embodiments will be described. FIG. 2 is a block diagram showing an example of a configuration of a radio transmission apparatus 10 according to a first embodiment. In FIG. 2, the solid lines indicate signal lines, and the broken lines indicate power lines. The radio transmission apparatus 10 is a fixed radio transmission apparatus that uses a main communication module 16, which will be described later, to perform point-to-point communication with other radio transmission apparatuses 10. More specifically, the radio transmission apparatus 10 is a high-speed fixed radio transmission apparatus used in a backhaul of a mobile communication network, a telephone network, or the like. The radio transmission apparatus 10 may instead be an apparatus used for other purposes. The radio transmission apparatus 10 can perform LPWA communication using the LPWA module 18 in addition to communication using the main communication module 16.

The radio transmission apparatus 10 is accommodated in a station (not shown). The station includes various devices. For example, the station includes devices such as power supply equipment for supplying power to the devices in the station including the radio transmission apparatus 10, an air conditioner for adjusting the temperature environment in the station, a locking device for locking the entrance and exit of the station, and a camera device for obtaining images.

As shown in FIG. 2, the radio transmission apparatus 10 includes an apparatus power supply unit 11, a power supply monitoring unit 12, a power supply switching unit 13, a storage battery 14, a CPU 15, a main communication module 16, a signal processing unit 17, an LPWA module 18, and a monitoring control unit 19.

The apparatus power supply unit 11 is a main power supply of the radio transmission apparatus 10 and corresponds to the power supply unit 4 in FIG. 1. The apparatus power supply unit 11 is a power supply circuit for supplying power to each component of the radio transmission apparatus 10. Specifically, the apparatus power supply unit 11 supplies power for operating the CPU 15, the signal processing unit 17, the main communication module 16, the LPWA module 18, and the monitoring control unit 19. The apparatus power supply unit 11 supplies power for the storage battery 14 to store power. The apparatus power supply unit 11 is connected to, for example, the power supply equipment of the station.

The power supply monitoring unit 12 is a circuit for monitoring whether there is an abnormality of the power supply in the apparatus power supply unit 11. The power supply monitoring unit 12 constantly monitors the voltage or current of the power supply in the apparatus power supply unit 11, and detects a power supply abnormality (abnormality such as low voltage, high voltage, or overcurrent). When a power supply abnormality is detected, the power supply monitoring unit 12 notifies the power supply switching unit 13 to switch the power supply.

The power supply switching unit 13 is a circuit which, upon receipt of a notification from the power supply monitoring unit 12, switches a power supply path from a supply path by the apparatus power supply unit 11 to a supply path by the storage battery 14. When the supply path is switched by the power supply switching unit 13, power supply from the storage battery 14 to the LPWA module 18 and the monitoring control unit 19 is started.

The storage battery 14 corresponds to the storage battery 5 in FIG. 1. The storage battery 14 is a chargeable/dischargeable storage battery, and holds power that at least the LPWA module 18 and the monitoring control unit 19 can operate. As described above, the storage battery 14 has a storage battery function capable of storing power from the apparatus power supply unit 11 when the apparatus power supply unit 11 is normal.

The CPU (Central Processing Unit) 15 executes a program and executes processing in accordance with the program. For example, the CPU may execute a predetermined process using the data obtained from the signal processing unit 17 or may output the data to be wirelessly transmitted by the main communication module 16 to the signal processing unit 17. Further, the CPU 15 may execute a predetermined process using the data obtained from the monitoring control unit 19.

The main communication module 16 corresponds to the radio communication unit 2A in FIG. 1. The main communication module 16 is a circuit for performing radio communication in accordance with a predetermined radio communication scheme different from the LPWA communication. In this example embodiment, as an example, the main communication module 16 is a circuit for performing radio communication defined by a predetermined point-to-point radio communication scheme using microwaves. However, anything other than microwaves may be used. For example, the main communication module 16 may be a circuit for performing communication using millimeter waves or the like. The main communication module 16 is also a circuit for performing FWA (Fixed Wireless Access) communication. The main communication module 16 is a circuit for modulating and demodulating signals and transmitting and receiving radio waves in accordance with a predetermined radio communication scheme.

The signal processing unit 17 is a circuit that performs predetermined processing on digital signals. For example, the signal processing unit 17 extracts predetermined information from the digital signal output from the main communication module 16, and outputs the extracted information to the CPU 15 or the like. The signal processing unit 17 generates a digital signal to be transmitted by the main communication module 16, and outputs the generated digital signal to the main communication module 16.

The LPWA module 18 corresponds to the radio communication unit 2B of FIG. 1. The LPWA module 18 is a circuit for performing the LPWA communication. In this example embodiment, any known LPWA communication may be used. For example, as the LPWA, LoRaWAN (Long Range Wide Area Network) (registered trademark), SigFox (registered trademark), Wi-Fi HaLow (IEEE 802.11 ah), 3GPP LTE-M, 3GPP NB-IOT, and the like may be used. The LPWA module 18 is a circuit for modulating and demodulating signals and transmitting and receiving radio waves in accordance with the communication scheme of the LPWA. Details of the LPWA module 18 will be described later with reference to FIG. 3.

The monitoring control unit 19 corresponds to the control unit 3 in FIG. 1. The monitoring control unit 19 controls a predetermined device provided in the station accommodating the radio transmission apparatus 10 based on a signal received by the LPWA module 18. The monitoring control unit 19 controls the LPWA module 18 to transmit monitoring information about the predetermined device provided in the station accommodating the radio transmission apparatus 10. Details of the monitoring control unit 19 will be described later with reference to FIGS. 4 and 5.

Figure 3:
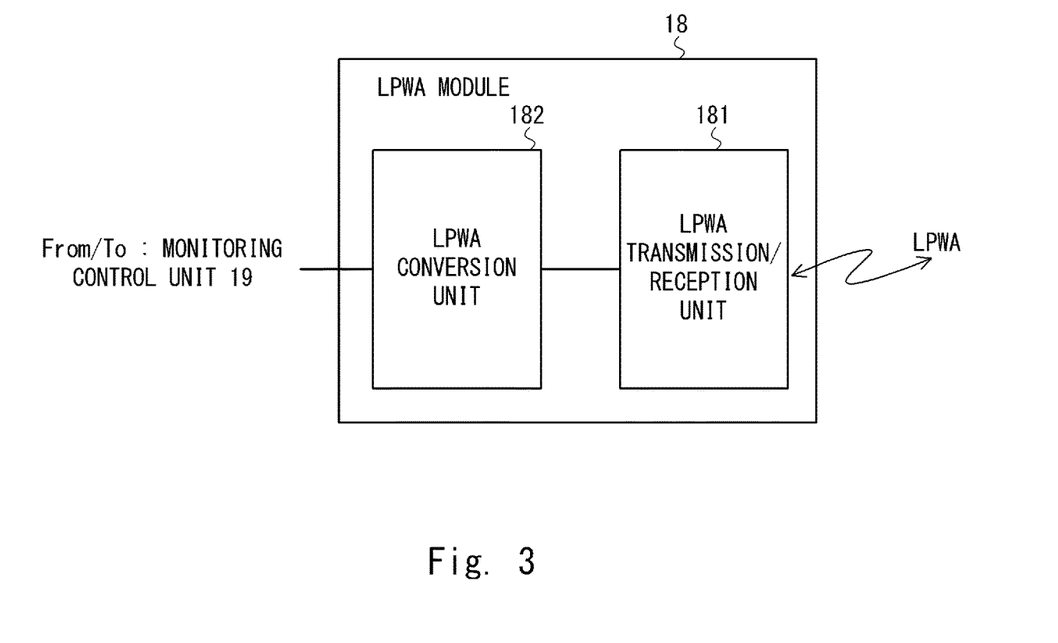
FIG. 3 is a block diagram showing an example of a configuration of an LPWA module.

FIG. 3 is a block diagram showing an example of the configuration of the LPWA module 18. As shown in FIG. 3, the LPWA module 18 includes an LPWA transmission/reception unit 181 and an LPWA conversion unit 182.

The LPWA transmission/reception unit 181 is a circuit for transmitting and receiving radio waves, and is a transmission/reception circuit including, for example, an antenna. At the time of reception, the LPWA transmission/reception unit 181 receives a radio signal from another communication apparatus performing the LPWA communication and passes the received signal to the LPWA conversion unit 182. At the time of transmission, the LPWA transmission/reception unit 181 receives a signal from the LPWA conversion unit 182 and transmits a radio signal to another communication apparatus performing the LPWA communication. The other communication apparatus performing the LPWA communication may be another radio transmission apparatus 10 or an LPWA base station.

The LPWA conversion unit 182 is a circuit for performing modulation/demodulation processing and A/D conversion (analog-to-digital conversion). At the time of reception, the LPWA conversion unit 182 demodulates and converts the analog signal from the LPWA transmission/reception unit 181 into a digital signal, and passes the digital signal to the monitoring control unit 19. At the time of transmission, the LPWA conversion unit 182 converts the digital signal from the monitoring control unit 19 into an analog signal, performs modulation processing, and passes the modulated analog signal to the LPWA transmission/reception unit 181.

Figure 4:
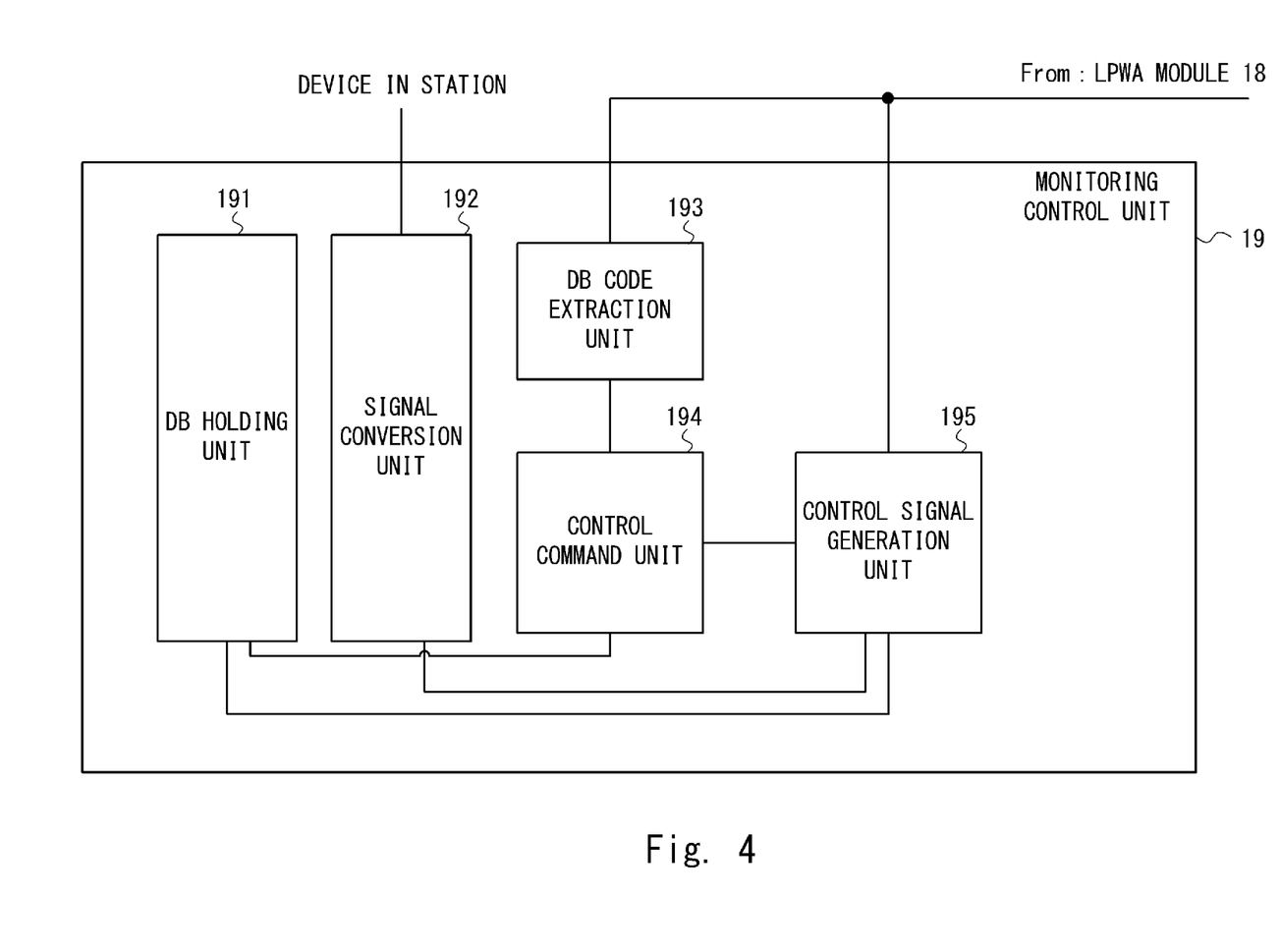
FIG. 4 is a block diagram showing an example of a configuration of a monitoring control unit as a component for controlling a predetermined device provided in a station.
Figure 5:
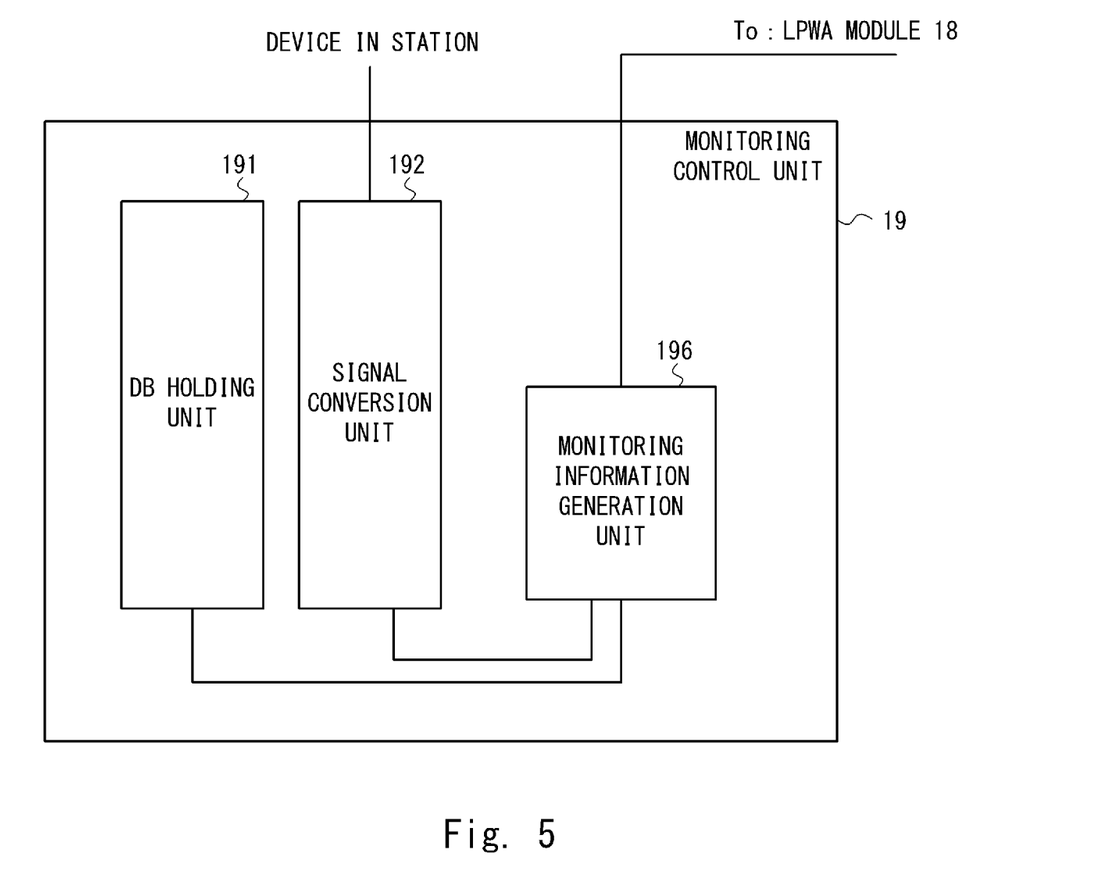
FIG. 5 is a block diagram showing an example of a configuration of the monitoring control unit as a component for transmitting monitoring information about a predetermined device provided in a station.

Next, the monitoring control unit 19 will be described in detail. FIG. 4 is a block diagram showing an example of a configuration of the monitoring control unit 19 as a component for controlling a predetermined device provided in the station. FIG. 5 is a block diagram showing an example of a configuration of the monitoring control unit 19 as a component for transmitting monitoring information about a predetermined device provided in the station. As shown in FIG. 4, the monitoring control unit 19 as a component for controlling a predetermined device provided in the station includes a DB holding unit 191, a signal conversion unit 192, a DB code extraction unit 193, a control command unit 194, and a control signal generation unit 195. As shown in FIG. 5, the monitoring control unit 19 as a component for transmitting monitoring information about a predetermined device provided in the station includes a DB holding unit 191, a signal conversion unit 192, and a monitoring information generation unit 196.

The DB holding unit 191 is a database for storing signal patterns expected in advance as signals to be received by the LPWA module 18, and storing signal patterns expected in advance as monitoring signals to be input to the radio transmission apparatus 10 from a device of the station. The DB holding unit 191 is also referred to as a control pattern storing unit, because it stores signal patterns expected in advance as signals received by the LPWA module 18. The DB holding unit 191 is also referred to as a monitoring pattern storage unit, because it stores signal patterns expected in advance as monitoring signals to be input to the radio transmission apparatus 10 from a device in the station.

Figure 6:
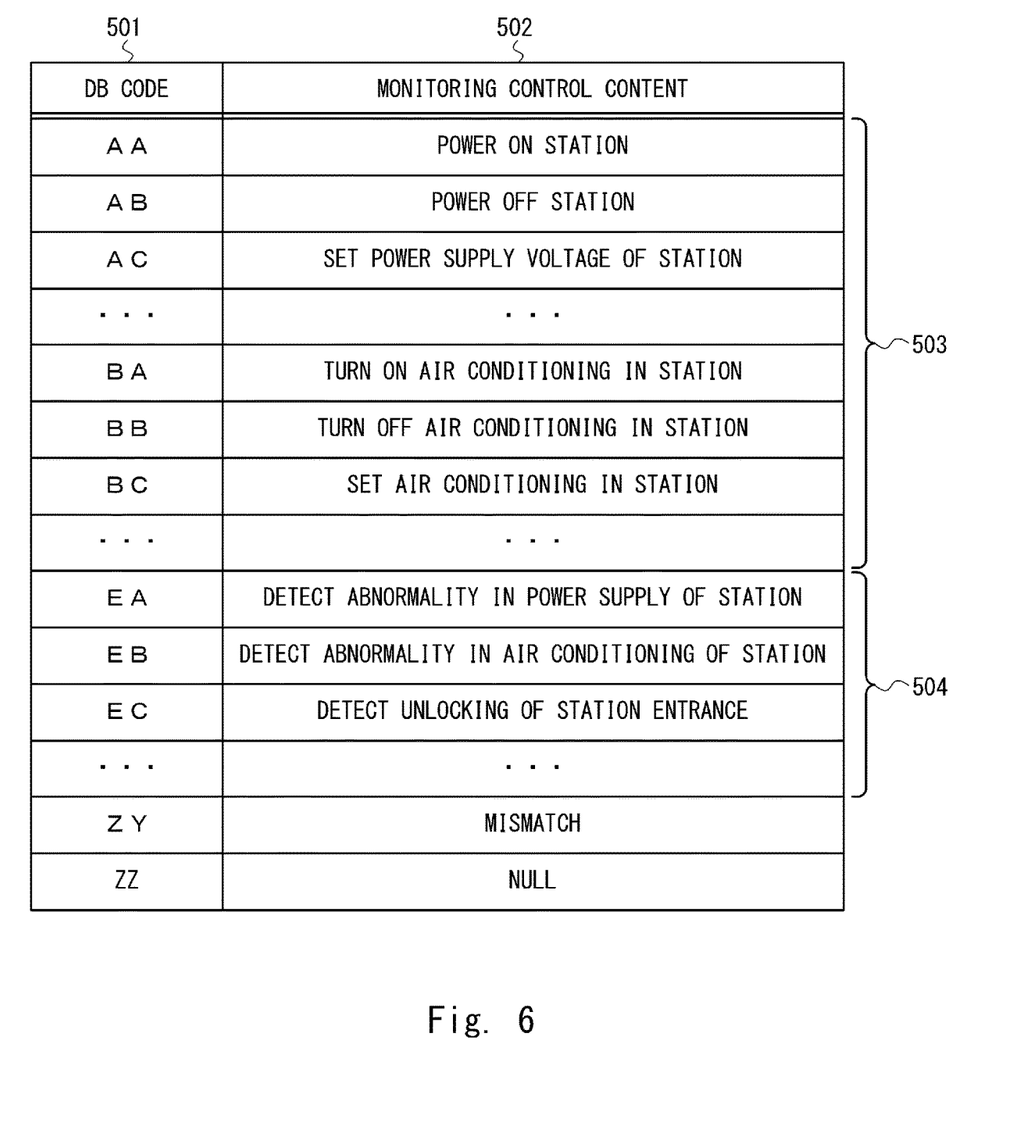
FIG. 6 is a table showing an example of information stored in a DB holding unit.

FIG. 6 is a table showing an example of information stored in the DB holding unit 191. The DB holding unit 191 stores DB codes 501 and monitoring control contents 502 in association with each other. The monitoring control contents 502 are roughly divided into control information 503 indicating control contents and monitoring information 504 indicating monitoring contents. The DB code 501 is code information for identifying the control information 503 and the monitoring information 504. In the example shown in FIG. 6, "AA", "AB", "AC", "BA", "BB", and "BC" are the code information for identifying the control information 503. Further, "EA", "EB" and "EC" are the code information for identifying the monitoring information 504. Thus, the DB holding unit 191 stores the control information and the code information for identifying the control information in association with each other. The DB holding unit 191 stores the monitoring information and the code information for identifying the monitoring information in association with each other. Here, the control information and the code information for identifying the control information are signal patterns expected in advance as signals received by the LPWA module 18. The monitoring information is a signal pattern expected in advance as a monitoring signal to be input to the radio transmission apparatus 10 from a device in the station.

The monitoring control contents 502 shown in FIG. 6 are examples, and the DB holding unit 191 may include other monitoring control contents. For example, based on the transmission using the LPWA module 18, control to switch a power supply to a redundant power supply in the station power supply may be performed, the entrance/exit of the station may be managed, or the monitoring may be performed using camera images. In addition, information obtained by performing machine learning in advance based on the location environment (climate, weather, temperature, humidity, and power supply statuses) of the station may be used as the control information.

The signal conversion unit 192 converts a signal format for communication between the monitoring control unit 19 and a device in the station. For example, when the device in the station and the radio transmission apparatus 10 are connected by Ethernet, the signal conversion unit 192 converts a signal to be transmitted to the device in the station into a signal format conforming to IEEE 802.3, and converts a signal transmitted from the device into a predetermined signal format. When a device in the station and the radio transmission apparatus 10 are connected by Wi-Fi, the signal conversion unit 192 converts a signal into a signal format conforming to IEEE 802.11, and converts a signal transmitted from the device in the station into a predetermined signal format.

Next, the DB code extraction unit 193, the control command unit 194, and the control signal generation unit 195 shown in FIG. 4 will be described. In this example embodiment, a signal including the control information 503 and the DB code 503 for identifying the control information 501 is transmitted to the radio transmission apparatus 10 by the LPWA communication as a signal for controlling a predetermined device provided in the station. Thus, when the signal received by the LPWA communication is normally obtained by the radio transmission apparatus 10, the radio transmission apparatus 10 obtains a signal that matches any one of the pairs of the control information 503 and the DB code 501 stored in the DB holding unit 191. However, if a signal cannot be obtained normally for some reason, a signal that does not match the information stored in the DB holding unit 191 is obtained. In this example embodiment, by comparing the information obtained by the radio transmission apparatus 10 with the information stored in the DB holding unit 191, it is confirmed whether or not a signal for controlling a device has been successfully obtained.

Note that, for example, the radio transmission apparatus 10 cannot normally obtain a signal in the following cases. However, these are only examples, and the signal may not be obtained normally for reasons other than these reasons.

When an error occurs in an LPWA signal received by the LPWA module 18 due to an error in a transmission line, an error due to external noise, or the like When the LPWA module 18 fails When an error occurs in the transmission from the LPWA module 18 to the monitoring control unit 19

When the monitoring control unit 19 fails

The DB code extraction unit 193 extracts the DB code from the digital signal output from the LPWA module 18. For example, the DB code extraction unit 193 extracts a partial bit stream at a predetermined position from the entire bit stream of the digital signal output from the LPWA module 18 as the DB code. The DB code extraction unit 193 passes the extracted DB code to the control command unit 194.

The control command unit 194 compares the DB code stored in the DB holding unit 191 with the DB code extracted by the DB code extraction unit 193, and determines whether the DB code matching the DB code extracted by the DB code extraction unit 193 is stored in the DB holding unit 191. That is, the control command unit 194 determines whether the value of the extracted DB code includes an error.

When the DB code matching the DB code extracted by the DB code extraction unit 193 is not stored in the DB holding unit 191, the subsequent operations are not performed. In this case, the control command unit 194 returns a signal indicating a mismatch (e.g., in FIG. 6, DB code: ZY (mismatch)) to the communication apparatus which has transmitted the DB code and the control information via the LPWA module 18.

When the DB code matching the DB code extracted by the DB code extraction unit 193 is stored in the DB holding unit 191, the control command unit 194 obtains the control information stored in association with the DB code from the DB holding unit 191. Then, the control command unit 194 passes the DB code extracted by the DB code extraction unit 193 and the control information obtained from the DB holding unit 191 to the control signal generation unit 195.

The control signal generation unit 195 extracts the control information from the digital signal output from the LPWA module 18. For example, the control signal generation unit 195 extracts a partial bit stream at a predetermined position from the entire bit stream of the digital signal output from the LPWA module 18 as the control information. Further, the control signal generation unit 195 compares the extracted control information with the control information passed from the control command unit 194, and determines whether the extracted control information matches the control information passed from the control command unit 194. That is, the control signal generation unit 195 determines whether the value of the extracted control information includes an error.

When the extracted control information does not match the control information passed from the control command unit 194, the subsequent operations are not performed. In this case, the control signal generation unit 195 returns a signal indicating a mismatch (e.g., in FIG. 6, DB code: ZY (mismatch)) to the communication apparatus which has transmitted the DB code and the control information via the LPWA module 18.

The control signal generation unit 195 outputs the extracted control information to the signal conversion unit 192 when the extracted control information matches the control information passed from the control command unit 194. The signal conversion unit 192 converts the signal format of the control information input from the control signal generation unit 195, and outputs the converted control information as a control signal to an object to be controlled. In this way, the monitoring control unit 19 controls the object to be controlled based on the signal received by the LPWA module 18.

Note that the control command unit 194 and the control signal generation unit 195 may determine whether objects to be compared match each other by any comparison method. For example, a comparison using FCS (Frame Check Sequence) may be performed. At this time, a CRC (Cyclic Redundancy Check) operation may be performed, or a parity check may be performed.

As described above, when the signal pattern stored in the DB holding unit 191 matches the signal pattern obtained from the signal received by the LPWA module 18, the monitoring control unit 19 outputs a control signal corresponding to the signal received by the LPWA module 18 to the object to be controlled. In this way, the monitoring control unit 19 controls the objects to be controlled. Therefore, erroneous control due to erroneous signals can be prevented. In particular, in this example embodiment, when a first comparison result indicates a match and a second comparison result indicates a match, the monitoring control unit 19 outputs a control signal corresponding to the signal received by the LPWA module 18 to the object to be controlled to thereby control the object. Here, the first comparison is a comparison for confirming whether the information extracted from the signal received by the LPWA module 18 as the code information matches any of the code information stored in the DB holding unit 191. The second comparison is a comparison for confirming whether the control information stored in the DB holding unit 191 in association with the code information determined to match the code information extracted from the signal received from the LPWA module 18 matches the information extracted as the control information from the signal received by the LPWA module 18. In this manner, the monitoring control unit 19 performs double checks. By doing so, it is possible to more reliably prevent erroneous control as compared to when only one of the checks is performed.

Next, the monitoring information generation unit 196 shown in FIG. 5 will be described. The monitoring signal received by the signal conversion unit 192 from a device in the station is converted into a predetermined signal format by the signal conversion unit 192, and then output to the monitoring information generation unit 196 as the monitoring information. The monitoring information generation unit 196 compares the monitoring information input from the signal conversion unit 192 with the monitoring information stored in the DB holding unit 191, and determines whether the monitoring information matching the monitoring information input from the signal conversion unit 192 is stored in the DB holding unit 191.

When the monitoring information matching the monitoring information input from the signal conversion unit 192 is stored in the DB holding unit 191, the monitoring information generation unit 196 obtains the DB code stored in association with the monitoring information from the DB holding unit 191. Then, the monitoring information generation unit 196 transmits the monitoring information and the DB code to another communication apparatus via the LPWA module 18.

Note that the monitoring information generation unit 196 obtains a predetermined DB code (e.g., in FIG. 6, DB code: ZZ (NULL)) when the monitoring information matching the monitoring information input from the signal conversion unit 192 is not stored in the DB holding unit 191. Then, the monitoring information generation unit 196 transmits the monitoring information and the predetermined DB code to the other communication apparatus via the LPWA module 18.

In this manner, the monitoring control unit 19 transmits the monitoring information of a predetermined device provided in the station accommodating the radio transmission apparatus 10 using the LPWA module 18. It is therefore possible to not only control the device but also monitor the device more reliably.

In particular, when the signal pattern stored in the DB holding unit 191 does not match the signal pattern obtained from the monitoring signal input to the radio transmission apparatus 10, the monitoring control unit 19 transmits predetermined information indicating that they do not match using the LPWA module 18. It is thus possible to notify other communication apparatuses that the monitoring information received from the device is erroneous monitoring information.

Figure 7:
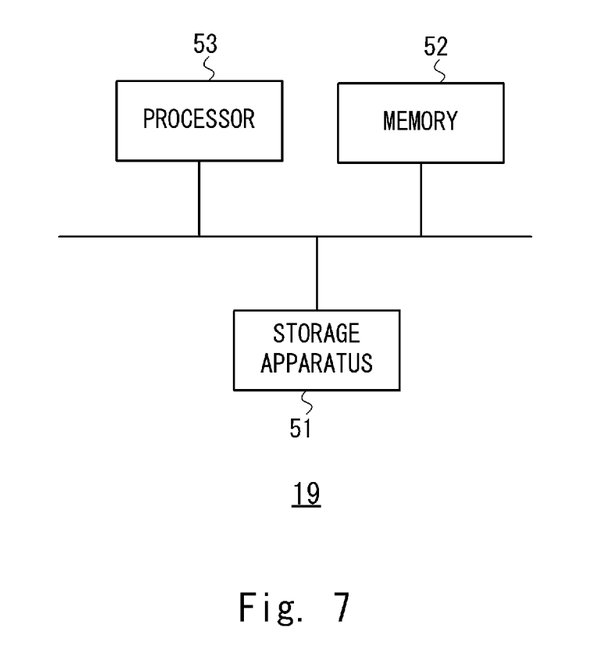
FIG. 7 is a block diagram showing an example of a hardware configuration of the monitoring control unit.

Although the configuration of the monitoring control unit 19 has been described above, each component of the monitoring control unit 19 may be implemented by a hardware circuit or software. When the monitoring control unit 19 is implemented by software, the monitoring control unit 19 has, for example, a hardware configuration as shown in FIG. 7. That is, for example, as shown in FIG. 7, the monitoring control unit 19 includes a storage apparatus 51, a memory 52, and a processor 53.

The storage apparatus 51 is a storage such as a hard disk drive or a solid state drive. The storage apparatus 51 may be used as the DB holding unit 191. Note that instead of the storage apparatus 51, the memory 52 may be used as the DB holding unit 191.

The memory 52 is composed of, for example, a combination of a volatile memory and a nonvolatile memory. The memory 52 is used to store software executed by the processor 53 which includes one or more instructions (computer programs), and the like.

The processor 53 reads out the software (computer program) from the memory 52 and executes it to thereby perform processing for each component of the monitoring control unit 19 shown in FIGS. 4 and 5. As described above, the monitoring control unit 19 may have a function as a computer. The processor 53 may be, for example, a microprocessor, an MPU (Micro Processor Unit), or a CPU (Central Processing Unit). The processor 53 may include a plurality of processors.

Figure 8:
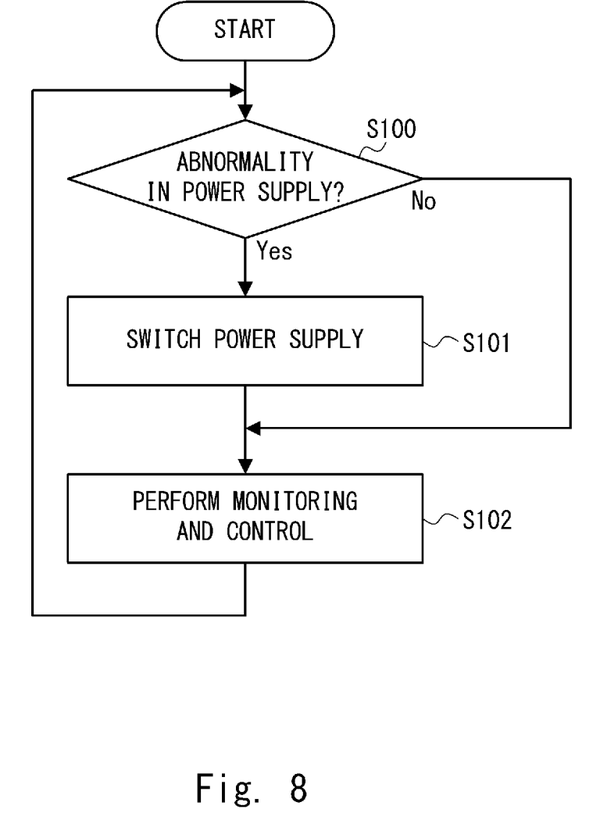
FIG. 8 is a flowchart showing an example of an operation of the radio transmission apparatus according to the first example embodiment.

FIG. 8 is a flowchart showing an example of the operation of the radio transmission apparatus 10. An example of the operation of the radio transmission apparatus 10 will be described below with reference to FIG. 8.

In step 100 (S100), the power supply monitoring unit 12 determines whether the power supply in the apparatus power supply unit 11 is abnormal. When an abnormality of the power supply is detected, the process proceeds to step 101, whereas when no abnormality of the power supply is detected, the process proceeds to step 102.

In step 101 (S101), the power supply switching unit 13 switches the power supply path from the supply path by the apparatus power supply unit 11 to the supply path by the storage battery 14. Next, the process proceeds to step 102.

In step 102 (S102), the monitoring control unit 19 performs the above-described processing to monitor and control the device. In this example embodiment, as an example, the communication for monitoring and controlling the device is performed via the LPWA module 18 regardless of whether an abnormality occurs in the power supply of the apparatus power supply unit 11. However, when the power supply in the apparatus power supply unit 11 is normal, the communication for monitoring and controlling the device may be performed via the main communication module 16.

The first example embodiment has been described so far. According to the radio transmission apparatus 10, even when an abnormality occurs in the apparatus power supply unit 11, and communication by the main communication module 16 cannot be performed, control or monitoring of the device can be performed remotely by the LPWA communication with the power supply from the storage battery 14. This makes it possible to manage the device without a worker having to rush to the station. Moreover, the cost of maintenance and operation can be reduced.

Second Example Embodiment

Figure 9:
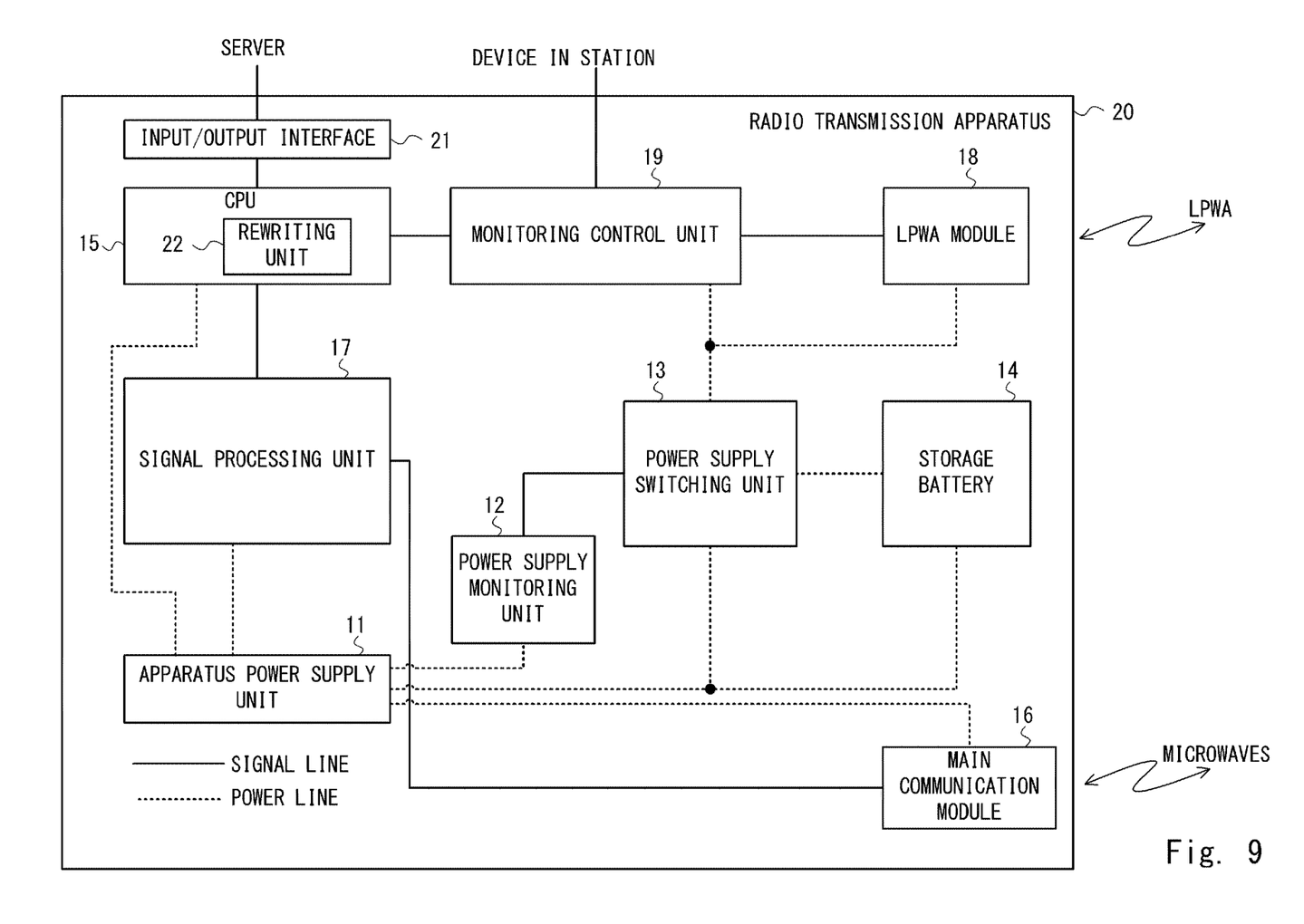
FIG. 9 is a block diagram showing an example of a configuration of a radio transmission apparatus according to a second example embodiment.

Next, a second example embodiment will be described. The second example embodiment differs from the first embodiment in that the information stored in the DB holding unit 191 can be rewritten in the second embodiment. FIG. 9 is a block diagram showing an example of the configuration of the radio transmission apparatus 20 according to the second embodiment. In FIG. 9, the solid lines indicate signal lines, and the broken lines indicate power lines. The radio transmission apparatus 20 is different from the radio transmission apparatus 10 in that the radio transmission apparatus 20 includes an input/output interface 21 and a rewriting unit 22. Hereinafter, the difference between the radio transmission apparatus 20 and the radio transmission apparatus 10 will be described.

The input/output interface 21 is an interface circuit for connecting to any apparatus (e.g., a host computer such as an NMS (Network Management System) server or an AI (Artificial Intelligence) server) for transmitting update data of information stored in the DB holding unit 191. The input/output interface 21 may be a network interface such as a network card. For example, the input/output interface 21 may receive update data reflecting results of predetermined machine learning executed by a server.

The rewriting unit 22 rewrites and updates the information (e.g., the DB code 501, the control information 503, and the monitoring information 504 shown in FIG. 6) stored in the DB holding unit 191 using the update data obtained via the input/output interface 21. The process of the rewriting unit 22 is implemented, for example, by the CPU 15 reading out the software (not shown) from the memory (computer program) and executing it.

Thus, in this example embodiment, the rewriting unit 22 can rewrite the DB holding unit 191. Thus, this example embodiment enables more flexible operation than the first example embodiment.

The program mentioned in the first and second example embodiments can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above-described example embodiments, and may be modified as appropriate without departing from the spirit of the disclosure. For example, in the above example embodiments, an object to be controlled and an object to be monitored are devices provided in the station. However, the components included in the radio transmission apparatuses 10 and 20 may be objects to be controlled or objects to be monitored.

In the above example embodiments, a signal including the control information and the DB code is transmitted to the radio transmission apparatuses 10 and 20 as a signal for controlling a predetermined device provided in the station. As a result, erroneous control is prevented by double checks for checking on the DB code and checking on the control information. However, as a signal for controlling a predetermined device provided in the station, a signal including the DB code and not including the control information may be transmitted to the radio transmission apparatuses 10 and 20. In this case, the radio transmission apparatuses 10 and 20 only need to check the DB code.

Further, although the robustness against a power failure is improved in the above example embodiments, a configuration for improving the robustness against any another failure factor may be added.

Although the present disclosure has been described above with reference to the example embodiments, the present disclosure is not limited by the above. Various changes that can be understood by a person skilled in the art can be made to the configuration and details of the present disclosure within the scope of the invention.

This application is based upon and claims the benefit of priority from Japanese patent application No. 2018-099446, filed on May 24, 2018, the disclosure of which is incorporated herein in its entirety by reference.

REFERENCE SIGNS LIST

RADIO TRANSMISSION APPARATUS
2A RADIO COMMUNICATION UNIT
2B RADIO COMMUNICATION UNIT
3 CONTROL UNIT
4 POWER SUPPLY UNIT
5 STORAGE BATTERY
10 RADIO TRANSMISSION APPARATUS
11 APPARATUS POWER SUPPLY UNIT
12 POWER SUPPLY MONITORING UNIT

13 POWER SUPPLY SWITCHING UNIT
14 STORAGE BATTERY
15 CPU
16 MAIN COMMUNICATION MODULE
17 SIGNAL PROCESSING UNIT
18 LPWA MODULE
19 MONITORING CONTROL UNIT
20 RADIO TRANSMISSION APPARATUS
21 INPUT/OUTPUT INTERFACE
22 REWRITING UNIT
51 STORAGE APPARATUS
52 MEMORY
53 PROCESSOR
181 LPWA TRANSMISSION/RECEPTION UNIT
182 LPWA CONVERSION UNIT
191 DB HOLDING UNIT
192 SIGNAL CONVERSION UNIT
193 DB CODE EXTRACTION UNIT
194 CONTROL COMMAND UNIT
195 CONTROL SIGNAL GENERATION UNIT
196 MONITORING INFORMATION GENERATION UNIT
501 DB CODE
502 MONITORING CONTROL CONTENT
503 CONTROL INFORMATION
504 MONITORING INFORMATION

The invention claimed is:

1. A radio transmission apparatus comprising:
a first radio communication circuit configured to perform radio communication in accordance with a predetermined radio communication scheme;
a second radio communication circuit configured to perform radio communication by LPWA (Low Power Wide Area) communication;
at least one memory storing program instructions;
at least one processor configured to execute the instructions stored in the memory to control a predetermined device provided in a station accommodating the radio transmission apparatus or the radio transmission apparatus based on a signal received by the second radio communication circuit;
a power supply circuit configured to supply power to the first radio communication circuit, the second radio communication circuit, and the processor; and
a storage battery for supplying power to the second radio communication circuit and the control processor when an abnormality occurs in the power supply circuit.

2. The radio transmission apparatus according to claim 1, further comprising control pattern storage for storing a signal pattern expected in advance as the signal received by the second radio communication circuit, wherein
the processor is further configured to execute the instructions to output a control signal corresponding to the signal received by the second radio communication circuit to an object to be controlled to thereby control the object to be controlled
when the signal pattern stored in the control pattern storage matches a signal pattern obtained from the signal received by the second radio communication circuit.

3. The radio transmission apparatus according to claim 2, wherein
the control pattern storage stores control information representing a control content and code information for identifying the control information in association with each other as the signal pattern expected in advance, and
the processor is further configured to execute the instructions to output a control signal corresponding to the signal received by the second radio communication circuit to the object to be controlled to thereby control the object to be controlled
when information extracted as the code information from the signal received by the second radio communication circuit matches any of the code information stored in the control pattern storage, and the control information stored in the control pattern storage in association with the code information matching the information extracted as the code information from the signal received by the second radio communication circuit matches information extracted as the control information from the signal received by the second radio communication circuit.

4. The radio transmission apparatus according to claim 2, wherein the processor is further configured to execute the instructions to rewrite the signal pattern stored in the control pattern storage.

5. The radio transmission apparatus according to claim 1, wherein
the processor is further configured to execute the instructions to transmit monitoring information about the predetermined device provided in the station accommodating the radio transmission apparatus or the radio transmission apparatus using the second radio communication circuit.

6. The radio transmission apparatus according to claim 5, further comprising monitoring pattern storage for storing the signal pattern expected in advance as a monitoring signal input to the radio transmission apparatus, wherein
the processor is further configured to execute the instructions to transmit predetermined information using the second radio communication circuit
when the signal pattern stored in the monitoring pattern storage does not match the signal pattern obtained from the monitoring signal input to the radio transmission apparatus, the predetermined information indicating that they do not match.

7. A control method comprising:
supplying, when an abnormality occurs in power supply circuit configured to supply power to first radio communication circuit configured to perform radio communication by a predetermined radio communication scheme, power to second radio communication circuit and processor, the second radio communication circuit being configured to perform radio communication by LPWA (Low Power Wide Area) communication and the processor being configured to execute program instructions stored in a memory to control a predetermined device provided in a station accommodating a radio transmission apparatus or the radio transmission apparatus based on a signal received by the second radio communication circuit from a storage battery;
receiving a signal by the second radio communication circuit operating by the power supplied from the storage battery; and
performing control, by the processor operating by the power supplied from the storage battery, based on the signal received by the second radio communication circuit.

* * * * *